(12) United States Patent
Tsuda et al.

(10) Patent No.: US 7,034,094 B2
(45) Date of Patent: Apr. 25, 2006

(54) PROCESS FOR PREPARING FLUORINE-CONTAINING POLYMER

(75) Inventors: Nobuhiko Tsuda, Settsu (JP); Ryoichi Fukagawa, Settsu (JP); Keisuke Tano, Settsu (JP); Daisuke Tanizawa, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/451,178

(22) PCT Filed: Dec. 11, 2001

(86) PCT No.: PCT/JP01/10831

§ 371 (c)(1),
(2), (4) Date: Jun. 20, 2003

(87) PCT Pub. No.: WO02/051875

PCT Pub. Date: Jul. 4, 2002

(65) Prior Publication Data

US 2004/0030074 A1 Feb. 12, 2004

(30) Foreign Application Priority Data

Dec. 22, 2000 (JP) .............................. 2000-390294

(51) Int. Cl.
*C08F 14/18* (2006.01)
(52) U.S. Cl. .................. 526/242; 526/206; 528/392
(58) Field of Classification Search ................ 526/242, 526/206; 528/392
See application file for complete search history.

(56) References Cited

U.S. PATENT DOCUMENTS

| | | | |
|---|---|---|---|
| 3,723,270 A | 3/1973 | Tabata et al. | |
| 4,100,225 A * | 7/1978 | Mueller | 525/276 |
| 5,182,342 A | 1/1993 | Feiring et al. | |
| 5,286,822 A | 2/1994 | Krespan et al. | |
| 5,310,870 A * | 5/1994 | Peavy | 528/392 |
| 5,663,251 A * | 9/1997 | Kato et al. | 526/206 |
| 5,710,345 A * | 1/1998 | Navarrini et al. | 568/596 |
| 6,716,942 B1 * | 4/2004 | Saito et al. | 526/242 |
| 6,900,287 B1 * | 5/2005 | Tsuda et al. | 528/401 |

FOREIGN PATENT DOCUMENTS

| | | |
|---|---|---|
| DE | 198 44 188 A1 | 3/2000 |
| EP | 0 723 979 A1 | 7/1996 |
| EP | 0 747 404 A1 | 12/1996 |
| EP | 0928796 A1 * | 7/1999 |
| GB | 1 188 889 | 4/1970 |
| GB | 1 355 595 | 6/1974 |
| JP | 6-199958 A | 7/1994 |
| JP | 11-35638 A | 2/1999 |
| JP | 11-92507 A | 4/1999 |
| WO | WO 99/48937 * | 9/1999 |

OTHER PUBLICATIONS

International Search Report Mar. 12, 2002 for PCT/JP01/10831.
Supplementary European Search Report for EP 01 27 2249 dated Aug. 25, 2004.

* cited by examiner

*Primary Examiner*—David W. Wu
*Assistant Examiner*—Henry S. Hu
(74) *Attorney, Agent, or Firm*—Sughrue Mion, PLLC

(57) ABSTRACT

There is provided the process for effectively preparing the fluorine-containing polymer without using CFC and HCFC which have a high polymerization rate and a high ozone depletion potential and a coating film having excellent mechanical properties, solvent resistance and chemical resistance can be formed using the obtained fluorine-containing polymer. In preparing the fluorine-containing polymer by polymerizing a monomer containing a fluoroolefin in a polymerization medium, the fluorine-containing solvent having an ozone depletion potential of 0 and a solubility of hydroxybutyl vinyl ether of not less than 0.5% is used as the polymerization medium.

6 Claims, No Drawings

PROCESS FOR PREPARING FLUORINE-CONTAINING POLYMER

TECHNICAL FIELD

The present invention relates to a process for preparing a fluorine-containing polymer, particularly a process for effectively preparing a fluorine-containing polymer by using a polymerization medium hardly causing environmental disruption, in which the polymer has less change in a proportion of components thereof and can form a coating film having an excellent impact resistance and a good appearance.

BACKGROUND ART

Fluorine-containing polymers are high molecular weight materials having excellent heat resistance, solvent resistance, weather resistance, chemical resistance, etc., and in recent years have been used for various applications making the best use of such characteristics.

As a method of preparing fluorine-containing polymers, there are known methods such as a solution polymerization method, suspension polymerization method and emulsion polymerization method. With respect to a polymerization medium for the solution polymerization and suspension polymerization, inactive solvents such as chlorofluorocarbon (CFC) and hydrochlorofluorocarbon (HCFC) have been usually used from the point of providing a high molecular weight copolymer and from the viewpoint of a polymerization rate. Examples of CFC are $CCl_2FCClF_2$ (CFC113), $CClF_2CClF_2$ (CFC114) and the like, and examples of HCFC are $CH_3CCl_2F$ (HCFC141b), $CH_3CCl_2F$ (HCFC142b) and the like. From the viewpoint of easiness of handling, CFC have been mainly used.

However depletion of an ozone layer was taken up as an international issue of environmental disruption in a global scale and use of specific CFC and HCFC which are substances causing this issue was prohibited. Therefore development of alternatives which are used instead of CFC and HCFC for preparing fluorine-containing polymers is greatly demanded.

As the alternatives to CFC, there have been proposed hydrofluorocarbons (HFC) having hydrogen atom and fluorocarbons (FC) since they have a low ozone depletion potential. However when a solvent not containing chlorine was used as a polymerization solvent, there were problems with lowering of a polymerization rate and in addition, lowering of appearance and mechanical properties of a coating film formed using the obtained fluorine-containing polymer.

Also WO9948937 discloses a technology of polymerizing a vinylidene fluoride copolymer in a HFC solvent, but there is neither suggestion as to polymerizability of copolymers other than the vinylidene fluoride copolymer nor description that a fluorine-containing solvent having an ability of dissolving a specific monomer is advantageous in a combination of fluoroolefins other than vinylidene fluoride from the viewpoint of polymerization efficiency and applied characteristics.

Under such a background as mentioned above, an object of the present invention is to provide a process for efficiently preparing a fluorine-containing polymer without using CFC and HCFC having a high polymerization rate and a high ozone depletion potential, in which a coating film formed using the obtained fluorine-containing polymer has excellent mechanical properties, solvent resistance and chemical resistance.

DISCLOSURE OF INVENTION

The present inventors have made intensive studies and have found that the above-mentioned object can be attained by using, as a polymerization medium, a fluorine-containing solvent having an ozone depletion potential of 0 and a solubility of hydroxybutyl vinyl ether (HBVE) of not less than 0.5%.

Namely, the present invention relates to a process for preparing a fluorine-containing polymer by polymerizing monomers containing a fluoroolefin in a polymerization medium, wherein a fluorine-containing solvent having an ozone depletion potential of 0 and a solubility of HBVE of not less than 0.5% is used as the polymerization medium.

As the above-mentioned monomers, there can be used one or more fluoroolefins and as case demands, monomer mixtures further containing a hydrocarbon monomer and/or a hydrocarbon monomer having functional group. A preferred hydrocarbon monomer having functional group is HBVE.

The above-mentioned polymerization medium is preferably $R_fCH_2R_f$, in which $R_f$ is the same or different and each is a perfluoro- or fluoro-alkyl group having 1 to 3 carbon atoms, particularly one or two carbon atoms. Concretely there are $CF_3CH_2CHF_2$ (HFC245fa) and $CF_3CH_2CF_2CH_3$ (HFC365mfc).

BEST MODE FOR CARRYING OUT THE INVENTION

A feature of the present invention is to use the fluorine-containing solvent having an ozone depletion potential of 0 and a solubility of HBVE of not less than 0.5% as the polymerization medium for preparing fluorine-containing polymers.

The ozone depletion potential means a value defined in Montreal Agenda and is calculated as a relative value provided that the ozone depletion potential of $CCl_3F$ (CFC-11) is 1.0.

Though the reason why the fluorine-containing solvent having the solubility of HBVE of not less than 0.5% can increase the polymerization rate in polymerization of a fluorine-containing monomer which does not contain a hydrocarbon monomer such as HBVE is not known, if the solubility of HBVE is smaller than 0.5%, not only the polymerization rate, particularly the initial polymerization rate is decreased but also when using a monomer mixture, a change in a proportion of monomer components of the obtained fluorine-containing copolymer is increased and also heat resistance, impact resistance and appearance of a coating film formed using the obtained fluorine-containing copolymer are lowered. A preferred solubility is not less than 1.0%.

Examples of such a specific fluorine-containing solvent are, for instance, HFC having 3 or 4 carbon atoms such as $CF_3CH_2CF_3$, $CF_3CH_2CHF_2$, $CF_3CH_2CH_2F$, $CF_3CHFCF_3$, $CF_3CHFCHF_2$, $CF_3CHFCH_2F$, $CHF_2CH_2CHF_2$, $CHF_2CH_2CH_2F$, $CH_2FCH_2CH_2F$, $CF_3CH_2CF_2CH_3$, $CF_3CFHCF_2CH_3$, $CHF_2CH_2CF_2CH_3$ and $CHF_2CFHCF_2CH_3$.

In addition, also useful are fluorine-containing solvents which are represented by $R_f^1OR$, in which $R_f^1$ is an omegahydrofluoroalkyl group, R is a non-fluorine-containing alkyl group having 1 to 3 carbon atoms, particularly methyl or ethyl, and have an ozone depletion potential of 0 and a solubility of HBVE of not less than 0.5%.

Examples of the $R_f^1$ OR which are used preferably are, for instance, $H(CF_2)_4OCH_3$, $H(CF_2)_4OC_2H_5$, $H(CF_2)_3OCH_3$ and the like.

Among the above-mentioned fluorine-containing solvents, it is preferable to use, as the polymerization medium, the solvents having a structure of $R_fCH_2R_f$, in which $R_f$ is the same or different and each is a perfluoro- or fluoro-alkyl group having 1 to 3 carbon atoms, particularly one or two carbon atoms, particularly $CF_3CH_2CF_3$, $CF_3CH_2CHF_2$, $CF_3CH_2CH_2F$, $CHF_2CH_2CHF_2$, $CHF_2CH_2CH_2F$, $CH_2FCH_2CH_2F$, $CF_3CH_2CF_2CH_3$ and $CHF_2CH_2CF_2CH_3$. This is because when a coating film is formed using the obtained resin, the coating film has an appearance having a high gloss.

Among the above-mentioned solvents having a structure of $R_fCH_2R_f$, particularly preferred are $CF_3CH_2CHF_2$ (boiling point: 15° C.) and $CF_3CH_2CF_2CH_3$ (boiling point: 40° C.) from the viewpoint of a low steam pressure around room temperature and easy handling.

In the present invention, as the polymerization medium, there may be used a mixture of two or more of the above-mentioned fluorine-containing solvents or the fluorine-containing solvent can be used in a combination of an inactive solvent such as water. An amount of the polymerization medium can be changed depending on kind of monomers to be polymerized, and is from 1 to 100 times, preferably from 1 to 50 times the weight of the whole monomers.

Examples of the fluorine-containing monomers to be polymerized using the above-mentioned specific polymerization medium are a fluoroolefin monomer, a monomer mixture containing two or more fluoroolefins and a monomer mixture further containing one or more hydrocarbon monomers and/or one or more hydrocarbon monomers having functional group.

Examples of the fluoroolefin are tetrafluoroethylene (TFE), chlorotrifluoroethylene (CTFE), trifluoroethylene (TrF), hexafluoropropylene (HFP), pentafluoropropylene and the like. Those fluoroolefins are polymerized solely or in a proper combination thereof depending on intended purposes. Further as case demands, it is possible to copolymerize, as a comonomer, (perfluoroalkyl) ethylenes having a perfluoroalkyl group of C4 to C12 such as $F(CF_2)_4CH=CH_2$ and $F(CF_2)_4CF=CH_2$; perfluoro(alkyl vinyl ethers) (PAVE) such as $R_f^2(OCFXCF_2)_mOCF=CF_2$, in which $R_f^2$ is a perfluoroalkyl group having 1 to 6 carbon atoms, X is fluorine atom or a trifluoromethyl group, m is an integer of from 1 to 6; $CH_3OCOCF_2CF_2OCF=CF_2$ and $FSO_2CF_2CF_2OCF(CF_3)CF_2OCF=CF_2$.

Among them, a TFE/HFP copolymer (FEP) and a TFE/PAVE copolymer (PFA) exhibit a significant effect of improving a polymerization rate.

Examples of the hydrocarbon monomer which is an optional comonomer component are, for instance, alkenes such as ethylene, propylene, butylene and isobutylene; alkyl vinyl ethers such as ethyl vinyl ether, propyl vinyl ether, butyl vinyl ether, isobutyl vinyl ether and cyclohexyl vinyl ether; vinyl esters such as vinyl acetate, vinyl propionate, vinyl n-butyrate, vinyl isobutyrate, vinyl valerate, vinyl pivalate, vinyl caproate, vinyl caprylate, vinyl caprate, vinyl versatate, vinyl laurate, vinyl myristate, vinyl palmitate, vinyl stearate, vinyl benzoate, vinyl t-butylbenzoate, vinyl cyclohexane carboxylate, vinyl monochloroacetate, vinyl adipate, vinyl acrylate, vinyl methacrylate, vinyl crotonate, vinyl sorbate, vinyl cinnamate, vinyl undecylenate, vinyl hydroxyacetate, vinyl hydroxypropionate, vinyl hydroxybutyrate, vinyl hydroxyvalerate, vinyl hydroxyisobutyrate and vinyl hydroxycyclohexane carboxylate; alkyl allyl ethers such as ethyl allyl ether, propyl allyl ether, butyl allyl ether, isobutyl allyl ether and cyclohexyl allyl ether; alkyl allyl esters such as ethyl allyl ester, propyl allyl ester, butyl allyl ester, isobutyl allyl ester and cyclohexyl allyl ester; and the like. Those hydrocarbon comonomers may be used in a mixture of two or more thereof.

Examples of the hydrocarbon monomer having functional group which is an optional comonomer are, for instance, hydroxyalkyl vinyl ethers such as hydroxyethyl vinyl ether, hydroxypropyl vinyl ether, hydroxybutyl vinyl ether, hydroxyisobutyl vinyl ether and hydroxycyclohexyl vinyl ether; monomers having carboxyl such as itaconic acid, succinic acid, succinic anhydride, fumaric acid, fumaric anhydride, crotonic acid, maleic acid, maleic anhydride and perfluorobutenoic acid; monomers having glycidyl such as glycidyl vinyl ether and glycidyl allyl ether; monomers having amino group such as aminoalkyl vinyl ether and aminoalkyl allyl ether; monomers having amide group such as (meth)acrylamide and methylolacrylamide; and the like. Particularly preferred is hydroxybutyl vinyl ether from the viewpoint of polymerization rate. Those comonomers may be used in a mixture of two or more thereof.

Examples of the fluorine-containing polymer obtained by polymerizing the above-mentioned monomers or monomer mixtures are, for instance, as follows. (Fluorine-Containing Polymers Consisting of Fluorine-Containing Monomers)

TFE/PAVE copolymer (PFA), TFE/HFP copolymer (FEP) and TFE/HFP/PAVE copolymer. (Fluorine-Containing Copolymers Comprising Fluoroolefin and Hydrocarbon Monomer)

Ethylene/TFE copolymer (ETFE), propylene/TFE copolymer, ethylene/HFP copolymer and CTFE/cyclohexyl vinyl ether copolymer. (Fluorine-Containing Copolymers Containing Hydrocarbon Monomer Unit Having Functional Group)

TFE/maleic anhydride copolymer, TFE/ally glycidyl ether copolymer, CTFE/cyclohexyl vinyl ether/maleic anhydride copolymer, CTFE/cyclohexyl vinyl ether/ally glycidyl ether copolymer, TFE/HFP/ethylene/maleic anhydride copolymer and TFE/HFP/ethylene/ally glycidyl ether copolymer.

Particularly preferred are fluorine-containing polymers containing, as an essential component, HBVE which is the hydrocarbon monomer having functional group. Examples of such a copolymer are TFE/hydroxybutyl vinyl ether copolymer, TFE/ethylene/hydroxybutyl vinyl ether copolymer, TFE/cyclohexyl vinyl ether/hydroxybutyl vinyl ether copolymer, CTFE/cyclohexyl vinyl ether/hydroxybutyl vinyl ether copolymer, CTFE/cyclohexyl vinyl ether/ethyl vinyl ether/hydroxybutyl vinyl ether copolymer, TFE/HFP/ethylene/hydroxybutyl vinyl ether copolymer, TFE/HFP/ethylene/vinyl benzoate/hydroxybutyl vinyl ether copolymer, TFE/HFP/ethylene/vinyl t-butylbenzoate/hydroxybutyl vinyl ether copolymer and the like.

In the present invention, either of solution polymerization method and suspension polymerization method can be used, and a polymerization initiator can be optionally selected from those which have been usually used, depending on the polymerization method. For example, there are partly fluorinated organic peroxides such as bis(chlorofluoroacyl) peroxide, bis(perfluoroacyl) peroxide and bis(ω-hydroperfluoroacyl) peroxide; organic peroxides having a peroxydicarbonate structure such as di-n-propyl peroxydicarbonate and diisopropyl peroxydicarbonate; organic peroxides having a diacyl structure such as isobutyryl peroxide, 3,5,5- trimethylhexanoyl peroxide and octanoyl peroxide; organic peroxides having a peroxy ester structure such as cumyl peroxyneodecanate, 1,1,3,3-tetramethylbutyl peroxyneodecanate, t-butyl peroxypivalate and t-butyl peroxybutyrate; and azo compounds such as azobisisobutyronitrile. An amount of the polymerization initiator can be changed depending on kind thereof, polymerization conditions, etc. The amount is usually from 0.005 to 5% by weight, particularly from about 0.05% by weight to about 0.5% by weight based on the whole monomers to be polymerized.

In the polymerization reaction of the present invention, a wide range of reaction conditions can be adopted without any particular limitation. For example, though an optimum polymerization reaction temperature can be selected depending on kind of the polymerization initiating source, etc., it is usually from 0° to about 100° C., particularly from about 30° to about 90° C. The reaction pressure can also be selected optionally and is usually from 0.1 to 5 MPaG, particularly preferably from about 0.5 MPaG to about 3 MPaG. In the present invention, the polymerization can be carried out advantageously without an excessive reaction pressure, and further a higher pressure can be adopted and the polymerization may be carried out under reduced pressure. Also in the present invention, the polymerization can be carried out batchwise or continuously.

In the polymerization of the present invention, a chain transfer agent may be used for controlling a molecular weight of the polymer. Examples of the chain transfer agent are, for instance, aliphatic hydrocarbons such as n-hexane and cyclohexane; aromatic hydrocarbons such as toluene and xylene; ketones such as acetone; acetic acid esters such as ethyl acetate and butyl acetate; alcohols such as methanol and ethanol; mercaptans such as methyl mercaptan; and the like. An amount of the chain transfer agent can be changed depending on a chain transfer constant of the compounds to be used. The amount is usually in a range of from 0.01% by weight to 20% by weight based on the polymerization medium.

The preparation process of the present invention is then explained by means of examples and comparative examples but the present invention is not limited to them.

Firstly, the solubility of HBVE in the fluorine-containing solvent was determined.

A 300 ml pressure resistant glass vessel was charged with 100 g of a fluorine-containing solvent shown in Table 1 and then 1 g of HBVE. After stirring at room temperature, the inside of the pressure resistant vessel was observed with naked eyes. When separation of the HBVE monomer was recognized, it was evaluated as "not dissolved" and when the mixture was homogeneous, it was evaluated as "dissolved" (solubility: 1% or more). The results are shown in Table 1. Table 1 also shows the ozone depletion potentials of the respective solvents.

TABLE 1

| Solvent | Solubility of HBVE (1% concentration based on solvent) | Ozone depletion potential |
|---|---|---|
| HFC245fa | Dissolved | 0 |
| HFC365mfc | Dissolved | 0 |
| $HC_2F_4OCH_3$ | Dissolved | 0 |

TABLE 1-continued

| Solvent | Solubility of HBVE (1% concentration based on solvent) | Ozone depletion potential |
|---|---|---|
| $HC_2F_4OC_2H_5$ | Dissolved | 0 |
| $F(CF_2)_4OCH_3$ | Not dissolved | 0 |
| $F(CF_2)_4OC_2H_5$ | Not dissolved | 0 |
| FC-C318 | Not dissolved | 0 |
| HCFC141b | Dissolved | 0.11 |

From Table 1, it can be seen that the polymerization media which satisfy the requirements prescribed in the present invention are HFC245fa, HFC365mfc, $HC_2F_4OCH_3$ and $HC_2F_4OC_2H_5$.

EXAMPLE 1

A 4-liter glass-lined autoclave was charged with 1,000 g of deionized water, and then pressurizing with nitrogen gas and deaeration were repeated three times to remove dissolved oxygen. Then 800 g of HFC245fa and 40 g of perfluoro(propyl vinyl ether) (hereinafter abbreviated to PPVE) were introduced under reduced pressure. While stirring, the inside temperature was maintained at 15° C. and TFE was introduced to maintain the inside pressure of the autoclave at 0.3 MPaG.

Then 3 g of bis(2,2,3,3,4,4,5,5,6,6,7,7-dodecafluoroheptanoyl) peroxide (hereinafter abbreviated to DHP) was added as a polymerization initiator, and immediately the reaction started. Since the inside pressure decreased with the advance of the reaction, TFE was additionally added to maintain the inside pressure of the autoclave at 0.3 MPa. After completion of the two-hour reaction, the stirring was terminated and un-reacted monomer and HFC245fa were removed by purging.

A white powder produced in the autoclave was washed with water and was dried at 120° C. for 12 hours to obtain 256 g of a PFA powder. With respect to physical properties of PFA, a melt viscosity thereof was $6.4 \times 10^4$ poises, and the PFA was one comprising TFE/PPVE=98/2% by mole (measured by molten state NMR method). A melting point thereof was 308° C. and a thermal decomposition initiation temperature was 450° C. With respect to a film produced by molding the PFA, a tensile strength and elongation thereof were 28.0 MPa (308 kgf/cm$^2$) and 289%, respectively.

COMPARATIVE EXAMPLE 1

A reaction was carried out for 3.7 hours in the same manner as in Example 1 except that FC-C318 was used instead of HFC245fa, and 243 g of a PFA powder was obtained. With respect to physical properties of PFA, a melt viscosity thereof was $5.8 \times 10^4$ poises, and the PFA was one comprising TFE/PPVE=97.5/2.5% by mole. A melting point thereof was 301° C. and a thermal decomposition initiation temperature was 436° C. With respect to a film produced by molding the PFA, a tensile strength and elongation thereof were 28.1 MPa (309 kgf/cm$^2$) and 286%, respectively.

From the results of Example 1 and Comparative Example 1, it can be seen that the use of HFC245fa makes the polymerization rate higher.

EXAMPLE 2

A 4-liter glass-lined autoclave was charged with 1,000 g of deionized water and then pressurizing with nitrogen gas and deaeration were repeated three times to remove dissolved oxygen. Then 1,000 g of HFC245fa and 5.5 g of 2,3,3,4,4,5,5-heptafluoro-1-pentene (hereinafter abbreviated to 7FP) were introduced under reduced pressure. While stirring, the inside temperature was maintained at 35° C. and TFE and ethylene were introduced to maintain the inside pressure of the autoclave at 0.8 MPaG and to adjust a proportion of TFE/ethylene at a gaseous phase to 55/45 (mole ratio).

Then 2 g of diisopropyl peroxydicarbonate was added as a polymerization initiator, and immediately the reaction started. Since the inside pressure decreased with the advance of the reaction, TFE and ethylene were additionally added to maintain the inside pressure of the autoclave at 0.8 MPaG and to adjust a proportion of TFE/ethylene at a gaseous phase to 55/45 (mole ratio). Also 4.5 g of 7FP was added successively. After completion of the three-hour reaction, un-reacted monomer and HFC245fa were removed by purging.

A white powder produced in the autoclave was washed with water and was dried at 120° C. for 12 hours to obtain 140 g of a ETFE powder. With respect to physical properties of ETFE, a melt viscosity thereof was $5.6 \times 10^4$ poises, and the ETFE was one comprising TFE/ethylene/7FP=53/44/3% by mole (measured by molten state NMR method). A melting point thereof was 263° C. and a thermal decomposition temperature was 348° C. With respect to a film produced by molding the ETFE, a tensile strength and elongation thereof were 42.3 MPa (465 kgf/cm$^2$) and 440%, respectively.

COMPARATIVE EXAMPLE 2

A reaction was carried out for 4.2 hours in the same manner as in Example 2 except that FC-C318 was used instead of HFC245fa, and 135 g of a ETFE powder was obtained. A melt viscosity of the ETFE was $5.8 \times 10^4$ poises, and the ETFE was one comprising TFE/ethylene/7FP=54/42/4% by mole. A melting point thereof was 265° C. and a thermal decomposition temperature was 343° C. With respect to a film produced by molding the ETFE, a tensile strength and elongation thereof were 36.3 MPa (400 kgf/cm$^2$) and 380%, respectively.

From the results of Example 2 and Comparative Example 2, it can be seen that the use of HFC245fa makes the polymerization rate higher and enhances mechanical properties of the obtained resin.

EXAMPLE 3

A 4-liter glass-lined autoclave was charged with 760 g of deionized water and 7 g of potassium carbonate and then pressurizing with nitrogen gas and deaeration were repeated three times to remove dissolved oxygen. Then 572 g of HFC245fa, 340 g of HFP and 3 g of allyl glycidyl ether were introduced under reduced pressure and the inside temperature was adjusted to 35° C. Further the inside pressure was adjusted to 1 MPaG with a monomer mixture of TFE/ethylene having a ratio of 82/18% by mole, and then 4 g of cyclohexane and 24 g of a 25% toluene solution of isobutyryl peroxide to initiate a reaction. Since the inside pressure decreased with the advance of the reaction, a monomer mixture of TFE/ethylene/HFP having a ratio of 45/39/16% by mole was continuously supplied to maintain the inside pressure at 1 MPaG. While adding 1.5 g of allyl glycidyl ether and 12 g of a 25% toluene solution of isobutyryl peroxide every six hours, the reaction was continued for 12 hours, and then the inside temperature and pressure of the autoclave were decreased to normal temperature and pressure to terminate the reaction. The obtained solid was washed and dried to obtain 157 g of a white powder of a fluorine-containing copolymer. According to $^{19}$F-NMR, $^1$H-NMR and elementary analyses, the obtained fluorine-containing copolymer was a copolymer comprising 34% by mole of TFE, 47% by mole of ethylene, 12% by mole of HFP and 7% by mole of allyl glycidyl ether. A glass transition temperature thereof was 43° C. and a molecular weight Mn thereof based on styrene which was measured by GPC was 17,000.

COMPARATIVE EXAMPLE 3

A reaction was carried out for 12 hours in the same manner as in Example 1 except that FC-C318 was used instead of HFC245fa, and 120 g of a white powder of a fluorine-containing copolymer was obtained. According to $^{19}$F-NMR, $^1$H-NMR and elementary analyses, the obtained fluorine-containing copolymer was one comprising 37% by mole of TFE, 45% by mole of ethylene, 12% by mole of HFP and 6% by mole of allyl glycidyl ether, and a glass transition temperature thereof was 42° C. and a molecular weight Mn based on styrene which was measured by GPC was 14,000.

EXAMPLE 4

A 4-liter glass-lined autoclave was charged with 760 g of deionized water and 7.6 g of potassium carbonate and then pressurizing with nitrogen gas and deaeration were repeated three times to remove dissolved oxygen. Then 600 g of HFC245fa, 320 g of HFP, 3.7 g of hydroxybutyl vinyl ether and 7.3 g of vinyl t-butylbenzoate were introduced under reduced pressure and the inside temperature was adjusted to 35° C. Further the inside pressure was adjusted to 1 MPaG with a monomer mixture of TFE/ethylene having a ratio of 82/18% by mole, and then 23 g of a 25% toluene solution of isobutyryl peroxide was introduced to initiate a reaction. Since the inside pressure decreased with the advance of the reaction, a monomer mixture of TFE/ethylene/HFP having a ratio of 45/39/16% by mole was continuously supplied to maintain the inside pressure at 1 MPaG. After the reaction was continued for 4.5 hours, the inside temperature and pressure of the autoclave were decreased to normal temperature and pressure to terminate the reaction. The obtained solid was washed and dried to obtain 111 g of a white powder of a fluorine-containing copolymer (TFE/ethylene/HFP/vinyl t-butylbenzoate copolymer). A glass transition temperature of the obtained fluorine-containing copolymer was 56° C. and a molecular weight Mn thereof based on styrene which was measured by GPC was 18,000.

EXAMPLES 5 to 7

Fluorine-containing polymers were prepared in the same manner as in Example 4 except that solvents shown in Table 2 were used instead of HFC245fa. A polymerization time and amount, glass transition point and molecular weight of the obtained fluorine-containing polymers are shown in Table 2.

COMPARATIVE EXAMPLES 4 to 7

Fluorine-containing polymers were prepared in the same manner as in Example 4 except that solvents shown in Table 2 were used instead of HFC245fa and a polymerization time was changed as shown in Table 2. Glass transition points and molecular weights of the obtained fluorine-containing polymers are shown in Table 2.

EXAMPLE 8

A 4-liter glass-lined autoclave was charged with 760 g of deionized water and 7.6 g of potassium carbonate and then pressurizing with nitrogen gas and deaeration were repeated three times to remove dissolved oxygen. Then 600 g of HFC245fa, 30 g of hydroxybutyl vinyl ether (HBVE), 140 g of cyclohexyl vinyl ether (CHVE) and further 150 g of CTFE were introduced under reduced pressure and the inside temperature was adjusted to 35° C. Then 15 g of a 25% toluene solution of isobutyryl peroxide was added to initiate a reaction. At that time, the inside pressure was 0.4 MPaG. Six hours after the initiation of the reaction, 10 g of a 25% toluene solution of isobutyryl peroxide was added and the reaction was further continued, and when the inside pressure became 0.1 MPaG after the three-hour reaction, the solvent and the remaining monomer were purged to terminate the reaction. The obtained solid was washed and dried to obtain 216 g of a white powder of a CTFE/HBVE/CHVE copolymer. A glass transition temperature of the obtained fluorine-containing copolymer was 57° C. and a molecular weight Mn thereof based on styrene which was measured by GPC was 20,000.

Cement Co., Ltd.) on an aluminum plate subjected to chemical conversion treatment. Immediately after that, baking was carried out at 200° C. for twenty minutes to obtain a coated plate.

The following tests were carried out using the obtained coated plate.

Gloss: A reflectance of light at an angle of incidence of 60° is measured according to ASTM D 523.

Impact resistance test: The impact resistance test is carried out at 18° to 27° C. by applying a load causing a 3 mm dent on the test plate with an impact resistance tester (Gardener Impact Resistance Tester) provided with a spherical head having a 16 mm diameter. A peeling test is conducted using a 20 mm wide adhesive tape. The impact resistance is judged from existence of cracking or peeling, namely whether or not cracking or peeling occur.

The gloss was 63 and there was neither cracking nor peeling in the impact resistance test.

COMPARATIVE EXAMPLE 8

A coated plate was produced in the same manner as in Example 9 except that 31 g of the fluorine-containing polymer powder prepared in Comparative Example 3 was used, and a gloss and impact resistance of the coating film were evaluated in the same manner as in Example 9. The gloss was 37 and in the impact resistance test, peeling occurred.

TABLE 2

| | Polymerization solvent | Polymerization time (hour) | Weight of polymer (g) | Glass transition point (° C.) | Number average molecular weight (Mn) |
|---|---|---|---|---|---|
| Example | | | | | |
| 5 | HFC365mfc | 4.2 | 125 | 55 | 17000 |
| 6 | HC$_2$F$_4$OCH$_3$ | 6.1 | 112 | 54 | 16000 |
| 7 | HC$_2$F$_4$OC$_2$H$_5$ | 7.3 | 109 | 56 | 15000 |
| Comparative Example | | | | | |
| 4 | F(CF$_2$)$_4$OCH$_3$ | 4.5 | 116 | 58 | 19000 |
| 5 | F(CF$_2$)$_4$OC$_2$H$_5$ | 5.0 | 121 | 53 | 18000 |
| 6 | FC-C318 | 5.3 | 127 | 55 | 17000 |
| 7 | HCFC141b | 4.8 | 108 | 57 | 16000 |

EXAMPLE 9

(Characteristics of Coating Film)

In a polyethylene bag were put 31 g of the fluorine-containing polymer powder obtained in Example 3, 18 g of titanium oxide TIPURE R 960, 3.5 g of dodecanedioic acid and 0.3 g of MODAFLOW. After mixing by shaking, melt-kneading was carried out at 125° C. with a two-screw melt-kneading machine (16 mm twin extruder available from Prism Co., Ltd.), followed by cooling and then pulverizing at room temperature for three minutes with a universal crasher (available from IKA CO., LTD.). The obtained powder was filtrated through a screen of 200 mesh to obtain a powder coating. This powder coating composition was coated at an applied voltage of 40 kV with a corona type powder coating gun (GX3300 available from Onoda

EXAMPLES 10 TO 14 and COMPARATIVE EXAMPLES 9 TO 12

Coated plates were produced in the same manner as in Example 9 except that 15.5 g of BESTAGON B-1530 (available from Hüuls Co., Ltd., ϵcaprolactam blocked isocyanate) was used instead of 3.5 g of dodecanedioic acid and the fluorine-containing polymer powders prepared in the respective Examples and Comparative Examples shown in Table 3 were used. A gloss and impact resistance of the coating film were evaluated in the same manner as in Example 9. The results are shown in Table 3.

TABLE 3

| | Resin used | Gloss | Characteristics of coating film<br>Impact resistance |
|---|---|---|---|
| Example | | | |
| 10 | Ex. 4 | 66 | Neither cracking nor peeling occurred. |
| 11 | Ex. 5 | 64 | Neither cracking nor peeling occurred. |
| 12 | Ex. 6 | 56 | Neither cracking nor peeling occurred. |
| 13 | Ex. 7 | 54 | Neither cracking nor peeling occurred. |
| 14 | Ex. 8 | 70 | Small cracking occurred. |
| Comparative Example | | | |
| 9 | Com.Ex. 4 | 43 | Cracking and peeling occurred. |
| 10 | Com.Ex. 5 | 39 | Cracking and peeling occurred. |
| 11 | FC-C318 | 37 | Cracking and peeling occurred. |
| 12 | HCFC141b | 65 | Neither cracking nor peeling occurred. |

From the results shown in Table 3, it can be seen that in case of the fluorine-containing polymers prepared by polymerizing in the solvent in which HBVE is not dissolved, the required gloss is not obtained and further the impact resistance is lowered.

INDUSTRIAL APPLICABILITY

According to the preparation process of the present invention, the fluorine-containing polymer can be effectively prepared without using CFC and HCFC which have a high polymerization rate and a high ozone depletion potential, and a coating film having excellent mechanical properties, solvent resistance and chemical resistance can be formed using the obtained fluorine-containing polymer.

The invention claimed is:

1. A process for preparing a fluorine-containing polymer by polymerizing a monomer containing a fluoroolefin represented by $C_nH_aF_b$ where a+b=2n in a polymerization medium, wherein a fluorine-containing solvent having an ozone depletion potential of 0 and a solubility of hydroxybutyl vinyl ether in said fluorine-containing solvent of not less than 0.5% is used as the polymerization medium, and said monomer is a monomer mixture further containing a hydrocarbon monomer having at least one functional group selected from the group consisting of hydroxyl, carboxyl, glycidyl and amide.

2. The process for preparation of claim 1, wherein said monomer is a monomer mixture further containing a hydrocarbon monomer.

3. The process for preparation of claim 1, wherein said hydrocarbon monomer having functional group is hydroxybutyl vinyl ether.

4. The process for preparation of claim 1, wherein said polymerization medium is $R_fCH_2R_f$, in which $R_f$ is the same or different and each is a perfluoro- or fluoro-alkyl group having 1 to 3 carbon atoms.

5. The process for preparation of claim 4, wherein said polymerization medium is $CF_3CH_2CHF_2$ or $CF_3CH_2CF_2CH_3$.

6. The process for preparation of claim 1, wherein said polymerization is conducted by suspension polymerization.

* * * * *